(12) United States Patent
Zhang et al.

(10) Patent No.: US 9,886,888 B2
(45) Date of Patent: *Feb. 6, 2018

(54) ELECTRONIC PAPER DISPLAY DEVICE AND DRIVING METHOD

(71) Applicant: BOE TECHNOLOGY GROUP CO., LTD., Beijing (CN)

(72) Inventors: Zhuo Zhang, Beijing (CN); Cuili Gai, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/008,971

(22) Filed: Jan. 28, 2016

(65) Prior Publication Data

US 2016/0148555 A1 May 26, 2016

Related U.S. Application Data

(63) Continuation of application No. 13/876,651, filed as application No. PCT/CN2012/083453 on Oct. 24, 2012, now Pat. No. 9,311,892.

(30) Foreign Application Priority Data

Jan. 9, 2012 (CN) .......................... 2012 1 0005173

(51) Int. Cl.
*G09G 3/20* (2006.01)
*G02F 1/167* (2006.01)
(Continued)

(52) U.S. Cl.
CPC ........... *G09G 3/2074* (2013.01); *G02F 1/167* (2013.01); *G09G 3/2003* (2013.01);
(Continued)

(58) Field of Classification Search
CPC .. G09G 3/2074; G09G 3/2003; G09G 3/2081; G09G 3/344; G02F 1/167
See application file for complete search history.

(56) References Cited

U.S. PATENT DOCUMENTS 9,311,892 B2* 4/2016 Zhang ..................... G02F 1/167
9,436,014 B2* 9/2016 Kroon ................ G02B 27/2214
(Continued)

FOREIGN PATENT DOCUMENTS

CN  101169567 A   4/2008
CN  101308855 A   11/2008
(Continued)

OTHER PUBLICATIONS

International Search Report dated Feb. 7, 2013; PCT/CN2012/083453.
(Continued)

*Primary Examiner* — Sejoon Ahn
(74) *Attorney, Agent, or Firm* — Ladas & Parry LLP

(57) ABSTRACT

Embodiments of the present invention relate to an electronic paper display device and its driving method. The electronic paper display device comprises a plurality of pixels. Each of the pixels includes at least two thin film transistors, and each thin film transistor is electrically connected to a corresponding data line and a corresponding gate line respectively, and within one refresh cycle, is turned on once separately. Embodiments of the invention can make refresh rate quicker and requirement on storage capacitance lower so as to achieve faster grayscale refresh.

11 Claims, 3 Drawing Sheets

(51) Int. Cl.
   *G09G 5/10* (2006.01)
   *G09G 3/34* (2006.01)

(52) U.S. Cl.
   CPC ........... *G09G 3/2081* (2013.01); *G09G 3/344* (2013.01); *G09G 5/10* (2013.01); *G02F 2001/1676* (2013.01); *G09G 2300/0426* (2013.01); *G09G 2300/0809* (2013.01); *G09G 2310/0205* (2013.01); *G09G 2310/0224* (2013.01); *G09G 2310/0262* (2013.01); *G09G 2320/0233* (2013.01); *G09G 2320/0252* (2013.01)

(56) References Cited

U.S. PATENT DOCUMENTS

| | | | | |
|---|---|---|---|---|
| 2003/0146890 | A1* | 8/2003 | Sasaki | G09G 3/3659 345/87 |
| 2004/0252116 | A1* | 12/2004 | Tobita | G02F 1/136213 345/211 |
| 2004/0263748 | A1* | 12/2004 | Park | G02F 1/134363 349/141 |
| 2006/0050035 | A1* | 3/2006 | Leo | G09G 3/3655 345/89 |
| 2006/0202927 | A1* | 9/2006 | Lee | G02F 1/1368 345/88 |
| 2007/0057892 | A1* | 3/2007 | Shin | G09G 3/3648 345/96 |
| 2007/0097072 | A1* | 5/2007 | Kim | G09G 3/3614 345/103 |
| 2008/0117348 | A1* | 5/2008 | Chen | G09G 3/3648 349/46 |
| 2008/0204613 | A1* | 8/2008 | Kim | G02F 1/133707 349/33 |
| 2009/0066636 | A1 | 3/2009 | Kim et al. | |
| 2010/0073282 | A1 | 3/2010 | Murayama | |
| 2010/0091049 | A1 | 4/2010 | Kim | |
| 2010/0245700 | A1* | 9/2010 | Zhao | G02F 1/13624 349/48 |
| 2011/0102396 | A1 | 5/2011 | Yamazaki | |
| 2011/0134156 | A1* | 6/2011 | Yamazaki | G02F 1/167 345/690 |
| 2011/0134162 | A1 | 6/2011 | Yamazaki | |
| 2011/0304654 | A1* | 12/2011 | Murayama | G09G 3/3446 345/690 |
| 2012/0162186 | A1* | 6/2012 | Kim, II | G02F 1/167 345/212 |
| 2012/0293762 | A1 | 11/2012 | Shin et al. | |
| 2014/0065325 | A1 | 3/2014 | Guo et al. | |
| 2014/0267967 | A1* | 9/2014 | Ro | G02F 1/136213 349/43 |

FOREIGN PATENT DOCUMENTS

| | | |
|---|---|---|
| CN | 101324732 A | 12/2008 |
| CN | 101685234 A | 3/2010 |
| CN | 101726957 A | 6/2010 |
| CN | 102654980 A | 9/2012 |
| JP | 2008-158385 A | 7/2008 |
| JP | 2008-165135 A | 7/2008 |

OTHER PUBLICATIONS

International Preliminary Report on Patentability dated Jul. 15, 2014; PCT/CN2012/083453.
First Chinese Office Action dated Jan. 6, 2014; Appln. No. 201210005173.3.
Second Chinese Office Action dated Jul. 8, 2014; Appln. No. 201210005173.3.
Third Chinese Office Action dated Sep. 30, 2014, Appln. No. 201210005173.3.
USPTO NFOA dated Sep. 2, 2014 in connection with U.S. Appl. No. 13/376,651.
USPTO NFOA dated Jun. 15, 2015 in connection with U.S. Appl. No. 13/876,651.
USPTO NOA dated Dec. 18, 2015 in connection with U.S. Appl. No. 13/876,651.

\* cited by examiner

ELECTRONIC PAPER DISPLAY DEVICE AND DRIVING METHOD

TECHNICAL FIELD

Embodiments of the present invention relate to an electronic paper display device and a driving method.

BACKGROUND

Electronic paper display devices (also referred to as electronic paper, digital paper) possess both characteristics of ordinary paper in displaying information and characteristics of computer display panels. The electronic paper display devices may be fabricated to have a thickness equivalent to that of a sheet of ordinary paper and can be utilized repeatedly; and moreover, the electronic paper display devices are capable of displaying dynamic pictures. Therefore, the electronic paper display devices are deemed as a kind of display means which is more environmentally friendly and expected to replace existing paper documents in the near future.

Most of the current researches by researchers focus on electronic paper display devices based on the electrophoretic technique. Electrophoresis refers to the movement of charged particles in an applied electric field. Electrophoretic display is a kind of bistable display, and particles in an electrophoretic liquid have two stable states. If there is no external force, these stable states will not be changed, and thus a display pattern can be maintained for a long time. Therefore, electrophoretic display needs an extremely low level of power consumption.

The research on an electrophoresis mode electronic paper display device has already begun as early as the 70s of the last century. In order to solve the problems of poor stability, short lifetime, etc., by realizing a micro-encapsulation treatment with electrophoretic particles, researchers of the Massachusetts Institute of Technology in the United States solved the problem of natural coagulation of particles, and stability of electrophoretic display was improved greatly. Industrialization of microencapsulated electronic ink has been successfully realized by "E-INK" company at present. Some companies have launched e-book products based on the microencapsulated electronic ink technology. Another method to improve stability of an electrophoretic solution has been proposed by "Sipix" company of the United States, which is a micro-cup technology. With the micro-cup technology, lattices with banks are firstly produced on a substrate, and then an electrophoretic solution is injected into the lattices, so that particles for electrophoretic display are obstructed from being coagulated by isolation banks between the lattices. Thus, stability and lifetime of the electrophoretic display are improved.

Regardless of the microcapsule technology or the microcup technology, in order to realize display of text information, the use of an active matrix drive technology is required. For example, a thin film transistor (TFT) technology is one way to achieve an active matrix.

An electrophoresis mode electronic paper display device usually comprises an upper substrate and a lower substrate disposed opposite to each other, and a layer of electrophoretic particles is filled between them. On the upper substrate is provided a common electrode; and on the lower substrate are provided pixel electrodes, which are usually arranged in a matrix shape and each of which corresponds to one pixel. With a TFT active matrix as an example, a pixel electrode is connected to a drain electrode of a TFT through a via hole, a source electrode of the TFT is connected to a signal line, and a gate electrode of the TFT is connected to a gate line. Based on the above configuration, switching-on of individual pixels is controlled by gate lines. When an ON voltage is applied to the gate electrode of the TFT, an active layer becomes conductive to make the drain electrode and the source electrode communicated with each other, and then a signal voltage can be applied to the pixel electrode, which is connected to the TFT, through the signal line. The signal voltage applied to the pixel electrode coordinates with a common voltage on the common electrode to form an electric field in the layer of electrophoretic particles, which causes electrophoretic particles to move so as to form a required pattern.

However, with respect to the electrophoresis mode electronic paper display device employing the active matrix driving technology, because the electrophoretic particles need to swim in a liquid and the swimming speed is relatively slow, the response speed of the electrophoresis mode electronic paper display device is relatively slow and it is hard to realize multiple-grayscale display. In addition to the above reason, with respect to an active substrate, there are the following two reasons. On the one hand, owing to a larger leakage current of the electronic paper display device, large storage capacitance is needed to guarantee good voltage stability, but large storage capacitance leads to a relatively long charging/discharging period, and this factor results in a relative slow refresh rate of the electronic paper display device. On the other hand, the driving mode of electronic paper is a pulse width modulation (PWM) driving method, i.e., one grayscale change can only become realized through more than ten or even dozens of refresh operations, and this further brings about the results that it is relatively difficult to realize the multiple-grayscale display of the electronic paper display device, image refresh rate is slow, and it is difficult to realize dynamic display. Furthermore, with the current drive mode, one update of image is completed by combining more than ten or even dozens of screen refresh operations together, and this combination of more than ten or even dozens of refresh operations is called as a pulse combination (waveform). Different grayscales generally need dozens of pulse combinations. Because the frequency for screen refresh is fixed (about 50 Hz), the frequency at which each pixel voltage is refreshed once is also fixed (i.e., consistent with the frequency of screen refresh), namely the intervals between pulses are fixed. Moreover, the pixel voltage for each refresh operation is also fixed (such as 0V, 15V or 30V). Therefore, possible combinations are less, and more grayscale displays may not be realized.

SUMMARY

According to embodiments of the invention, there are provided an electronic paper display device and a driving method, having a fast refresh rate and capable of realizing multiple-grayscale display.

In an aspect of the present invention, there is provided an electronic paper display device which comprises a plurality of pixels, a plurality of gate lines and a plurality of data lines, wherein each of the pixels includes at least two thin film transistors, and each thin film transistor is electrically connected to a corresponding data line and a corresponding gate line respectively, and within one refresh cycle, is turned on once separately.

In the electronic paper display device, for example, each of the pixels includes at least two sub-pixels, each of which includes at least two thin film transistors; each thin film transistor is electrically connected to a corresponding data line and a corresponding gate line respectively, and turned on once separately within one refresh cycle.

In the electronic paper display device, for example, the electronic paper display device further comprises: a resin protective insulating layer on the plurality of pixels.

In the electronic paper display device, for example, the at least two thin film transistors are in a single-gate structure or a dual-gate structure.

In the electronic paper display device, for example, the at least two thin film transistors are polysilicon or oxide thin film transistors.

In the electronic paper display device, for example, the at least two thin film transistors are organic thin film transistors.

In another aspect of the invention, there is further provided a driving method of an electronic paper display device, comprising: with a driving device, obtaining grayscale levels of each pixel in the electronic paper display device from an input video data signal, and determining a sequence and time intervals for turning-on of thin film transistors in each pixel according to the number N of the thin film transistors contained in the pixel and the grayscale levels of the pixel, so as to form a grayscale display scheme; applying a signal voltage to a data line corresponding to each thin film transistor of each pixel in accordance with the formed grayscale display scheme while a turning-on voltage is applied to a gate line corresponding to each thin film transistor of each pixel, so as to drive each pixel to present its grayscale levels, separately; for example, N is a natural number, and N☐2.

In the driving method, for example, applying of the signal voltage to the data line corresponding to each thin film transistor of each pixel in accordance with the formed grayscale display scheme comprises: applying groups of signal voltages of differently set magnitudes to data lines corresponding to the thin film transistors of each pixel in accordance with the formed grayscale display scheme, so as to drive each pixel to present its grayscale levels, separately.

In the driving method, for example, the groups of signal voltages of differently set magnitudes are 0V, ±10V, ±15V or ±30V.

In the driving method, for example, the time intervals for turning-on of the thin film transistors are the same.

According to embodiments of the invention, there are provided an electronic paper display device and its driving method; two TFTs, which are controllable independently and connected to respective corresponding gate and data lines, are included in one pixel, the device can be refreshed at least twice within one cycle in which a conventional electronic paper display device can be refreshed once. That is, in the electronic paper display device, at least two rows of TFTs are simultaneously turned on at each timing; furthermore, the above two refresh operations may work in connection with groups of different voltages and various intervals between cycles. As such, not only the refresh rate can be quickened, but also requirements on storage capacitance can be lowered. Furthermore, quicker grayscale update can be realized by the quicker refresh rate; when different intervals between refresh cycles are predetermined and more pulse combination schemes are provided, more and faster grayscale displays can be realized accordingly.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
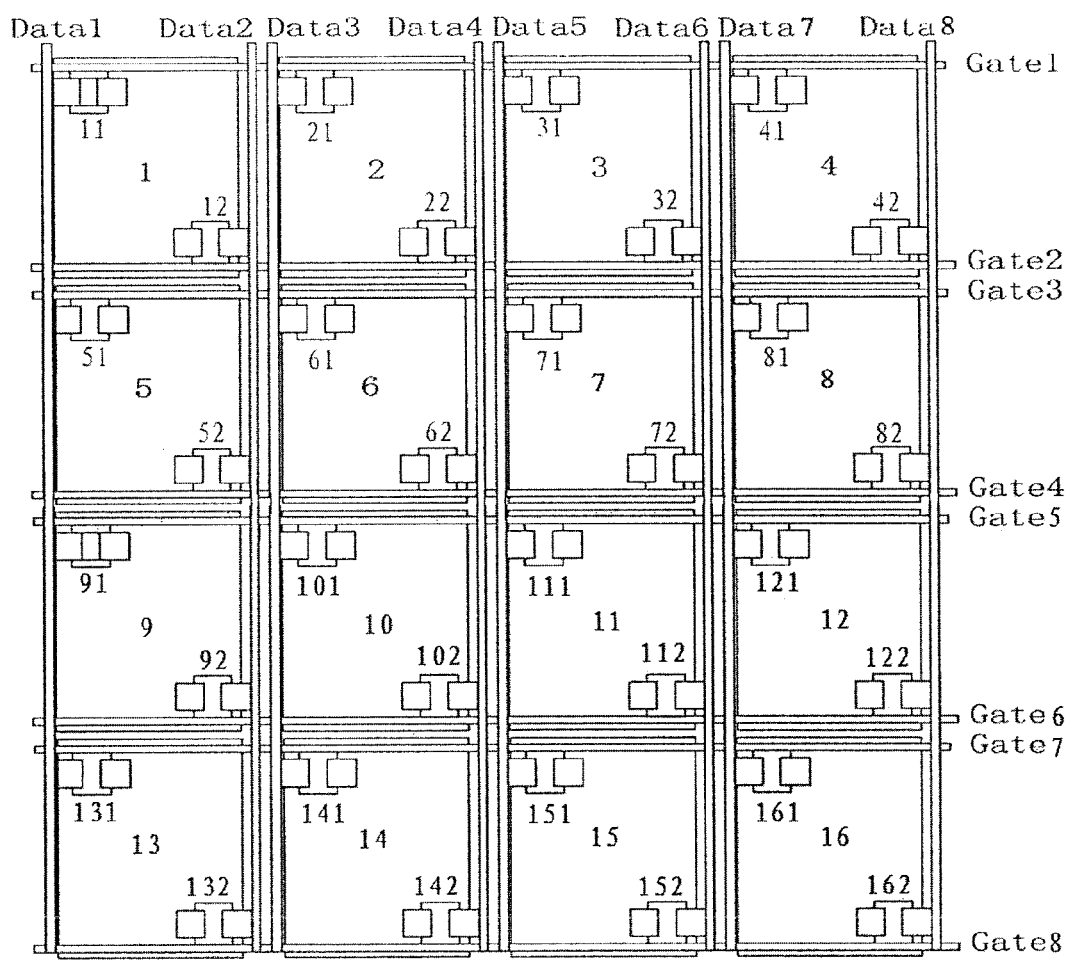
FIG. 1 is a structurally schematic view showing an electronic paper display device according to embodiment 1 of the invention.

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

Unless otherwise defined, the technical terminology or scientific terminology used herein should have the same meaning as commonly understood by one of ordinary skill in the art to which this invention belongs. Terms "first", "second" and the like used in specification and claims of the patent application of the invention do not show any order, number or importance, but are only used to distinguish different constituent parts. Likewise, a term "a," "an," "the" or the like does not indicate limitation in number, but specifies the presence of at least one. Terms such as "link," "linked," "connection," "connected" or the like is not limited to physical or mechanical connection, but can include electrical connection, whether directly or indirectly. "Upper," "lower," "left," "right" or the like is only used to describe a relative positional relationship, and when an absolute position of the described object is changed, the relative positional relationship is also changed accordingly.

According to an embodiment of the invention, there is provided an electronic paper display device comprising a plurality of pixels, which are defined by a plurality of gate lines and a plurality of data lines and arranged for example in a matrix array manner. Each pixel includes at least two thin film transistors (TFTs). Each TFT is electrically connected to a corresponding data line and a corresponding gate line, and within each refresh cycle, is turned on once individually. Thus, the electronic paper display device can be refreshed at least twice within one refresh cycle, which increases the refresh rate of the electronic paper display device.

Each pixel in the electronic paper display device according to the embodiment of the invention may further include at least two sub-pixels, each of which includes at least two TFTs. Each TFT is electrically connected to a corresponding data line and a corresponding gate line, and turned on once individually within one refresh cycle. This further increases the refresh rate of the electronic paper display device.

The electronic paper display device according to the embodiment of the invention may further comprise a protective insulating layer (PVX) on the pixels, the material for which may be resin, for increasing of aperture ratio.

The at least two TFTs of each pixel or sub-pixel in the electronic paper display device according to the embodiment of the invention may be designed as single-gate structure or dual-gate structure. A TFT in the dual-gate structure has smaller leakage current, and requirements on storage capacitance can be lowered.

The at least two TFTs of each pixel or sub-pixel in the electronic paper display device according to the embodiment of the invention can be used for charging and discharging a same pixel at a voltage, and the voltage may be 0V, ±10V, ±15V or ±30V.

When a plurality of groups of different voltages are applied to the at least two TFTs, more grayscale combinations can be achieved. For example, in the case of black-and-white display, high voltages (such as ±30V) can be used to realize high rate display, even a clip of dynamic video; while in the fine control of grayscale, low voltages (such as ±10V) can be used to achieve finer and more grayscales.

The at least two TFTs of each pixel or sub-pixel in the electronic paper display device according to the embodiment of the invention have the same turning-on cycle, but the interval between cycles may differ from each other.

When different intervals between turning-on cycles are used to drive the at least two TFTs, more grayscale combinations can be achieved; especially, in combination with the above case that different voltages are applied to the at least two TFTs, after a pixel is provided with a high voltage, then it is provided with a low voltage soon, thus finer control of grayscale can be conducted after fast response.

The at least two TFTs of each of the pixels or sub-pixels in the electronic paper display device according to the embodiment of the invention may be thin film transistors comprising polysilicon (p-si), oxide or other high-mobility semiconductor active layer so as to achieve a faster charging speed.

The at least two TFTs of each of the pixels or sub-pixels in the electronic paper display device according to the embodiment of the invention may be organic thin film transistors (OTFTs) so as to acquire flexibility.

The at least two TFTs of each of the pixels or sub-pixels in the electronic paper display device according to the embodiment of the invention may have single-gate structure or dual-gate structure.

Embodiment 1

As shown in FIG. 1, the electronic paper display device comprises a plurality of gate lines (denoted as Gate1, Gate2 . . . and so on), and a plurality of data lines (denoted as Data1, Data2 . . . and so on). These gate lines and data lines cross over each other to thereby define an array of pixels, which includes pixel 1, pixel 2, . . . , pixel 16, . . . and so on.

The pixel 1 includes a TFT11 and a TFT12; the pixel 2 includes a TFT21 and a TFT22; the pixel 3 includes a TFT31 and a TFT32; the pixel 4 includes a TFT41 and a TFT42; the pixel 5 includes a TFT51 and a TFT52; the pixel 6 includes a TFT61 and a TFT62; the pixel 7 includes a TFT71 and a TFT72; the pixel 8 includes a TFT81 and a TFT82; the pixel 9 includes a TFT91 and a TFT92; the pixel 10 includes a TFT101 and a TFT102; the pixel 11 includes a TFT111 and a TFT112; the pixel 12 includes a TFT121 and a TFT122; the pixel 13 includes a TFT131 and a TFT132; the pixel 14 includes a TFT141 and a TFT142; the pixel 15 includes a TFT151 and a TFT152; and the pixel 16 includes a TFT161 and a TFT162.

The pixels 1 to 16 are arranged in a 4*4 matrix. For each pixel, there are two gate lines and two data lines which correspond to two TFTs of the pixel, respectively. Certainly, embodiments of the invention are not limited to the above 4*4 array, and as desired, any arrangement in an n*m matrix may be possible. Here n and m may be numeral numbers larger than 1.

The data line Data1 is electrically connected to the TFT11, TFT51, TFT91 and TFT131; the data line Data2 is electrically connected to the TFT12, TFT52, TFT92 and TFT132; the data line Data3 is electrically connected to the TFT21, TFT61, TFT101 and TFT141; the data line Data4 is electrically connected to the TFT22, TFT62, TFT102 and TFT142; the data line Data5 is electrically connected to the TFT31, TFT71, TFT111 and TFT151; the data line Data6 is electrically connected to the TFT32, TFT72, TFT112 and TFT152; the data line Data7 is electrically connected to the TFT41, TFT81, TFT121 and TFT161; the data line Data8 is electrically connected to the TFT42, TFT82, TFT122 and TFT162.

The data lines Data1-8 are, for example, connected to one data driver.

The gate line Gate1 is electrically connected to TFT11, TFT21, TFT31 and TFT41; the gate line Gate2 is electrically connected to TFT12, TFT22, TFT32 and TFT42; the gate line Gate3 is electrically connected to TFT51, TFT61, TFT71 and TFT81; the gate line Gate4 is electrically connected to TFT52, TFT62, TFT72 and TFT82; the gate line Gate5 is electrically connected to TFT91, TFT101, TFT111 and TFT121; the gate line Gate6 is electrically connected to TFT92, TFT102, TFT112 and TFT122; the gate line Gate7 is electrically connected to TFT131, TFT141, TFT151 and TFT161; the gate line Gate8 is electrically connected to TFT132, TFT142, TFT152 and TFT162.

The gate lines Gate1-8 are, for example, connected to one gate driver.

Figure 2:
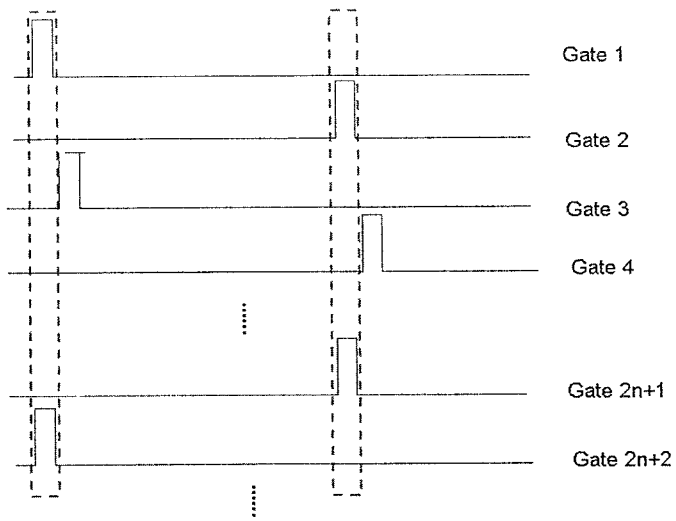
FIG. 2 is a graph showing drive waveforms for gate lines in the electronic paper display device according to embodiment 1 of the invention.

In one embodiment, signals with drive waveforms shown in FIG. 2 are used to drive the gate lines Gate1, Gate2 . . . Gate8, so that TFTs in the above pixels are turned on once separately within one refresh cycle. As such, two rows of TFTs are turned on at the same time, and then each pixel is charged and discharged twice within one refresh cycle. When a signal to each gate line is at a high level, one row of pixel TFTs corresponding to the gate line will be in ON state, i.e., source and drain electrodes are electrically connected to each other, so that pixels can be charged and discharged through respective data lines.

As shown in FIG. 2, for a pixel array having 2n rows of pixels (accordingly, there are 4n gate lines), within one refresh cycle, the first gate line Gate 1, . . . , the (2n+1)th gate line Gate 2n+1, . . . , and the (4n−1)th gate line Gate 4n−1, which are all odd-numbered, are scanned in sequence from small to large; meanwhile, even-numbered gate lines from the (2n+2)th gate line Gate 2n+2 to the 4nth gate line Gate 4n, and then, from the second gate line Gate 2 to the 2nth gate line Gate 2n, are scanned in sequence from small to large and then from large to small. This will be explained in detail as follows.

At the first timing, the first gate line Gate 1 and the (2n+2)th gate line Gate 2n+2 are scanned and applied with a ON voltage, so that pixels in the first row and in the (n+1)th row are turned on;

at the second timing, the third gate line Gate 3 and the (2n+4)th gate line Gate 2n+4 are scanned and applied with a ON voltage, so that pixels in the second row and in the (n+2)th row are turned on;

at the nth time, the (2n−1)th gate line Gate 2n−1 and the 4nth gate line Gate 4n are scanned and applied with a ON voltage, so that pixels in the nth row and in the 2nth row are turned on;

at the (n+1)th time, the (2n+1)th gate line Gate 2n+1 and the second gate line Gate 2 are scanned and applied with a ON voltage, so that pixels in the (n+1)th row and in the first row are turned on;

at the 2nth time, the (4n−1)th gate line Gate 4n−1 and the 2nth gate line Gate 2n are scanned and applied with a ON voltage, so that pixels in the 2nth row and in the nth row are turned on. Up to this point, the scanning operation in one refresh cycle ends.

Accordingly, during one refresh cycle, each row of pixels are turned on twice with such a time interval that is necessary for continuously scanning n rows between.

For each row of pixels, when they are turned on for the first time and for the second time, the row of pixels may be charged through different groups of data lines separately. For example, for pixels in the first row, when they are scanned for the first time, the pixels in this pixel row are each charged and discharged through odd-numbered data lines (that is, data lines Data1, Data3, . . . ); and when they are scanned for the second time, the pixels in this pixel row are each charged and discharged through even-numbered data lines (that is, data lines Data2, Data4, . . . ).

Figure 3:
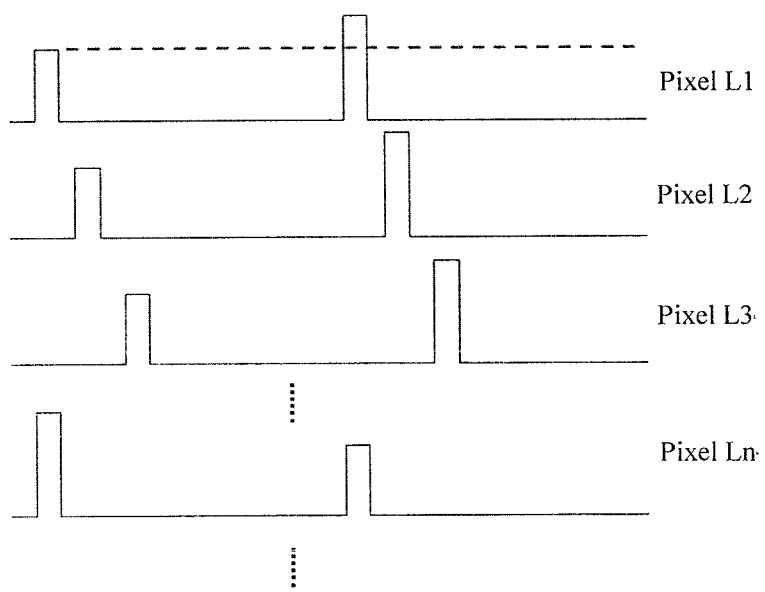
FIG. 3 is a graph showing waveforms of pixel refresh signals which have the same interval but different voltages for the electronic paper display device according to embodiment 1 of the invention.

For example, with respect to the case shown in FIG. 2, for the first gate line Gate 1 to the (4n−1)th gate line Gate 4n−1 which are odd-numbered, pixels in a corresponding row are charged and discharged with odd-numbered data lines; for the (2n+2)th gate line Gate 2n+2 to the 4nth gate line Gate 4n, and then the second gate line Gate 2 to the 2nth gate line Gate 2n, which are even-numbered, pixels in a corresponding row are charged and discharged with even-numbered data lines. The same pixel may be charged and discharged by the same voltage or as shown in FIG. 3, by different voltages. As shown in FIG. 3, during one refresh cycle, when pixels in the first row are turned on at the first timing and at the (n+1)th timing separately, low and high signal voltages are applied respectively to a certain pixel in the first row (such as the first pixel L1 in this row); likewise, when pixels in the second row are turned on at the second timing and at the nth timing separately, low and high signal voltages are applied respectively to a certain pixel in the second row (such as the first pixel L2 in this row) . . . .

Figure 4:
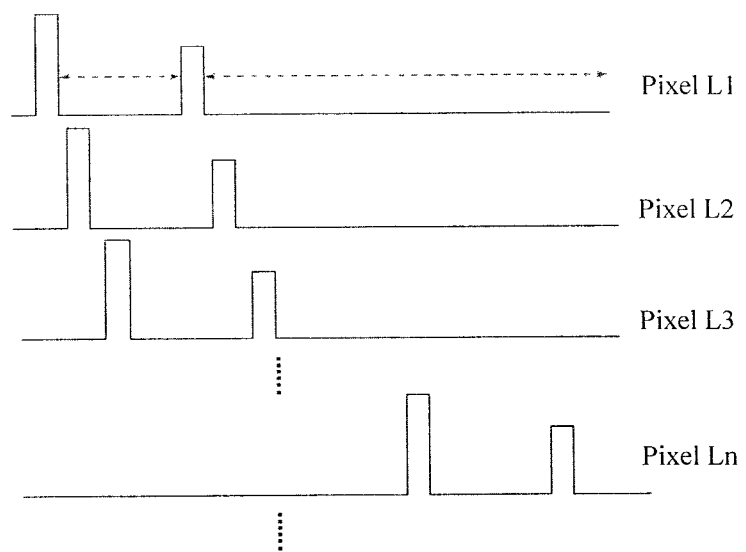
FIG. 4 is a graph showing waveforms of pixel refresh signals which have different intervals and different voltages for the electronic paper display device according to embodiment 1 of the invention.

Moreover, the cycles for the two operations of charging/discharging are the same, but the interval between the cycles may be the same or, as shown in FIG. 4, may be different from each other. These can be realized by changing the scanning mode, and different scanning modes may be related to different scanning cycles.

In FIG. 3 and FIG. 4, pixels L1, L2, . . . , Ln represent the first ones of the pixels in the first, second, . . . , nth rows, respectively.

In the above embodiment, each row of pixels is turned on twice earlier and later with such a time interval that is necessary for continuously scanning n rows, but the invention is not limited to this; for example, any natural number smaller than n may be applicable as well. As an example, in the case that the time interval is such a time interval necessary for scanning one row, when pixels in the first row are turned on, pixels in the second row are also turned on; when the pixels in the second row are turned on, pixels in the third row are also turned on; . . . ; when pixels in the (2n−1)th row are turned on, pixels in the 2nth row are also turned on; and when the pixels in the 2nth row are turned on, the pixels in the first row are also turned on. In this example, for the pixels in the first row, the time interval between turning-on for the first time and turning-on for the second time is not the time interval necessary for scanning one row, however this will not affect performance of the whole display apparatus.

According to an embodiment, there is further provided a driving method of an electronic paper display device, which can be used to drive the electronic paper display device according to the invention, for example, the electronic paper display device in the Embodiment 1.

The driving method according to the embodiment will be described below. A driving device obtains grayscale levels for each pixel in the electronic paper display device from an input video data signal, and determines the sequence and time intervals for turning-on of thin film transistors in each pixel according to the number N of the thin film transistors contained in the pixel and the grayscale levels of the pixel, so as to form a grayscale display scheme. For example, it is possible that only the sequence and timing for turning-on and turning-off of the thin film transistors are determined. The time interval for turning-on of the thin film transistors may be identical to or different from each other.

A turning-on voltage is applied to a gate line corresponding to each thin film transistor of each pixel by the driving device, so that corresponding pixels are turned on; and meanwhile, a signal voltages is applied to a data line corresponding to each thin film transistor of each pixel in accordance with the grayscale display scheme by the driving device, so as to respectively drive each pixel to present its grayscale levels, for example, brightens or darkness. N is a natural number, and N≥2.

Furthermore, groups of signal voltages of differently set magnitudes can be applied to data lines corresponding to the thin film transistors of each pixel in accordance with the grayscale display scheme by the driving device so as to drive respectively each pixel to present its gray levels. In this way, more grayscale combinations can be obtained, thereby implementing the set grayscale display scheme.

When the at least two TFTs are turned on separately, the same pixel can be charged and discharged with voltages. For example, the voltages may be 0V, ±10V, ±15V or ±30V.

When groups of different voltages are applied to the at least two TFTs, more grayscale combinations can be achieved. For example, it is possible that in the case of black-and-white display, high voltages are used to realize high rate display, even a clip of dynamic video; while in the fine control of grayscale, low voltages are used to achieve finer and more grayscales.

Embodiment 2

In the present embodiment, the at least two TFTs have the same turning-on cycle. That is, it is only required that the at least two TFTs be turned on once separately within one refresh cycle and each TFT has the same turning-on cycle.

Description will be made for an example in which two TFTs which are controllable independently are contained in each pixel and there are four rows of pixels in a 4*4 array (as shown in FIG. 1), and four refresh timings are included in one refresh cycle. For each row of pixels, there are two gate lines, and then there are 8 gate lines in total. Gate lines Gate 1 and Gate 2 act to control two TFTs of each pixel in the first row, respectively; gate lines Gate 3 and Gate 4 act to control two TFTs of each pixel in the second row, respectively; gate lines Gate 5 and Gate 6 act to control two TFTs of each pixel in the third row, respectively; and gate lines Gate 7 and Gate 8 act to control two TFTs of each pixel in the fourth row, respectively.

At the first timing within one refresh cycle, the gate lines Gate1 and Gate 6 are turned on, and for each of pixels in the first and third rows, one TFT is turned on, and a voltage can be written in through the respective distinct data line; at the second timing within one refresh cycle, the gate lines Gate 3 and Gate 8 are turned on, and for each of pixels in the second and fourth rows, one TFT is turned on, and a voltage can be written in through the respective distinct data line; at the third timing within one refresh cycle, the gate lines Gate 5 and Gate 2 are turned on, and for each of pixels in the third and first rows, one TFT is turned on, and a voltage can be written in through the respective distinct data line; and at the fourth timing within one refresh cycle, the gate lines Gate 7 and Gate 4 are turned on, and then for each of pixels in the fourth and second rows, one TFT is turned on, and a voltage can be written in through the respective distinct data line. As can be seen from above, each TFT has the same turning-on cycle, and at the same refresh timing within one refresh cycle, TFTs of the pixels in two rows are simultaneously turned on.

Embodiment 3

When different intervals between turning-on cycles are used to drive the at least two TFTs, more grayscale combinations can be achieved; especially, in combination with the above case that different voltages are applied to the at least two TFTs, after a pixel is provided with a high voltage, it can be further provided with a low voltage soon, thus a finer control of grayscale can be conducted after a fast response.

Likewise, description will be given for an example in which two TFTs which are controllable independently are contained in each pixel and there are four rows of pixels in a 4*4 array (as shown in FIG. 1), and four refresh timings are included in one refresh cycle. For each row of pixels, there are two gate lines, and then there are 8 gate lines in total. Gate lines Gate 1 and Gate 2 act to control two TFTs of each pixel in the first row, respectively, gate lines Gate 3 and Gate 4 act to control two TFTs of each pixel in the second row, respectively, gate lines Gate 5 and Gate 6 act to control two TFTs of each pixel in the third row, respectively, and gate lines Gate 7 and Gate 8 act to control two TFTs of each pixel in the fourth row, respectively.

At the first timing within one refresh cycle, the gate lines Gate 1 and Gate 4 are turned on, and for each of pixels in the first and second rows, one TFT is turned on, and a voltage can be written in through the respective distinct data line; at the second timing within one refresh cycle, the gate lines Gate 3 and Gate 6 are turned on, and for each of pixels in the second and third rows, one TFT is turned on, and a voltage can be written in through the respective distinct data line; at the third timing within one refresh cycle, the gate lines Gate 5 and Gate 8 are turned on, and for each of pixels in the third and fourth rows, one TFT is turned on, and a voltage can be written in through the respective distinct data line; and at the fourth time within one refresh cycle, the gate lines Gate 7 and Gate 2 are turned on, and for each of pixels in the fourth and first rows, one TFT is turned on, and a voltage can be written in through the respective distinct data line. As can be seen from above, each TFT has the same turning-on cycle, but the time interval between turning-on operations of the two TFTs in the same pixel may be different from each other, that is, the interval between cycles differs. The effect that TFTs for two rows of pixels are simultaneously turned on at the same refresh timing within one refresh cycle can also be achieved.

In summary, according to embodiments of the invention, there are disclosed an electronic paper display device and its driving method. According to embodiments of the invention, two TFTs, which are controllable independently and correspond to distinct gate lines and data lines, are included in one pixel, the device can be refreshed at least twice within one cycle in which a conventional electronic paper display device can be refreshed once; that is, in the electronic paper display device, at least two rows of TFTs are simultaneously turned on at each timing. Furthermore, the above two refresh operations may work in connection with groups of different voltages and various intervals between cycles. As such, not only the refresh rate can be quickened, but also requirements on storage capacitance can be lowered. Furthermore, quicker grayscale update can be realized by the quicker refresh rate; when different intervals between refresh cycles are predetermined and more pulse combination schemes are provided, more and faster grayscale displays can be realized accordingly.

The forgoing are merely exemplary embodiments of the invention, but are not used to limit protection scope of the invention. The protection scope of the invention is defined by attached claims.

The invention claimed is:

1. An electronic paper display device comprising:
a plurality of pixels,
a plurality of gate lines and a plurality of data lines,
wherein each pixel includes at least two thin film transistors, and each thin film transistor is electrically connected to a corresponding data line and a corresponding gate line respectively, and
within one refresh cycle, is turned on once separately, the at least two thin film transistors of the pixel are connected to a same pixel electrode of the pixel and connected to different data lines,
the same pixel electrode is directly connected to the at least two thin film transistors together and is applied with at least two voltages via the at least two thin film transistors respectively with in one refresh cycle,
wherein each row of pixels corresponding to two gate lines, and different rows of pixels corresponding to different gate lines, wherein for each two adjacent rows of pixels, a first gate line and a second gate line that correspond to a first row of pixels from the two adjacent rows of pixels are different from a third gate line and a fourth gate line that correspond to a second row of pixels from the two adjacent rows of pixels, and wherein the electronic paper display device includes 2n rows of pixels, the at least two thin film transistors, in each pixel includes a first thin film transistor and a second thin film transistor, and within one refresh cycle a time interval between a turning-on of the first thin film transistor and a turning-on of the second thin film transistor is equal to n times of a scanning time of one row of pixels, wherein n is an integer equal to or areater than one.

2. The electronic paper display device claimed as claim 1, wherein each of the pixels includes at least two sub-pixels, and each sub-pixel includes at least two thin film transistors, and each thin film transistor is electrically connected to a corresponding data line and a corresponding gate line respectively, and turned on once separately within one refresh cycle, and the at least two thin film transistors of the sub-pixel are connected to a same pixel electrode of the sub-pixel and connected to different data lines, and the same pixel electrode electrically connects the at least two thin film transistors together.

3. The electronic paper display device claimed as claim 1, further comprising: a resin protective insulating layer on the plurality of pixels.

4. The electronic paper display device claimed as claim 1, wherein the at least two thin film transistors are in a single-gate structure or a dual-gate structure.

5. The electronic paper display device claimed as claim 1, wherein the at least two thin film transistors are polysilicon or oxide thin film transistors.

6. The electronic paper display device claimed as claim 1, wherein the at least two thin film transistors are organic thin film transistors.

7. The electronic paper display device claimed as claim 2, further comprising: a resin protective insulating layer on the plurality of pixels.

8. The electronic paper display device claimed as claim 2, wherein the at least two thin film transistors are in a single-gate structure or a dual-gate structure.

9. The electronic paper display device claimed as claim 2, wherein the at least two thin film transistors are polysilicon or oxide thin film transistors.

10. The electronic paper display device claimed as claim 2, wherein the at least two thin film transistors are organic thin film transistors.

11. The electronic paper display device claimed as claim 1, wherein for each two adjacent columns of pixels, a first data line and a second data line that correspond to a first column of pixels from the two adjacent columns of pixels are different from a third data line and a fourth data line that correspond to a second column of pixels from the two adjacent columns of pixels.

\* \* \* \* \*